United States Patent
Shi et al.

(10) Patent No.: US 12,536,300 B2
(45) Date of Patent: Jan. 27, 2026

(54) SYSTEM AND METHOD FOR QUERY EFFICIENT BLACKBOX PHYSICALLY REALIZABLE ATTACK WITH BAYESIAN OPTIMIZATION

(71) Applicant: Robert Bosch GmbH, Stuttgart (DE)

(72) Inventors: Jianghong Shi, Pittsburgh, PA (US); Devin T. Willmott, Pittsburgh, PA (US); Wan-Yi Lin, Wexford, PA (US); Filipe J. Cabrita Condessa, Pittsburgh, PA (US); Bingqing Chen, Pittsburgh, PA (US); João D. Semedo, Pittsburgh, PA (US)

(73) Assignee: Robert Bosch GmbH (DE)

( * ) Notice: Subject to any disclaimer, the term of this patent is extended or adjusted under 35 U.S.C. 154(b) by 101 days.

(21) Appl. No.: 18/399,939

(22) Filed: Dec. 29, 2023

(65) Prior Publication Data
US 2025/0217493 A1 Jul. 3, 2025

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .................... G06F 2221/033; G06F 21/577
See application file for complete search history.

(56) References Cited

U.S. PATENT DOCUMENTS

| | | | |
|---|---|---|---|
| 9,996,902 B2 | 6/2018 | Milanfar et al. | |
| 11,941,823 B2* | 3/2024 | Xu | B60R 11/04 |
| 12,002,055 B1* | 6/2024 | Miller | G06Q 30/04 |
| 12,019,740 B2* | 6/2024 | Trost | G06F 16/26 |
| 2008/0168561 A1* | 7/2008 | Durie | G06F 21/577 726/23 |
| 2018/0350085 A1 | 12/2018 | Lu et al. | |
| 2020/0057965 A1 | 2/2020 | Howard | |
| 2021/0025679 A1* | 1/2021 | Hoch | H04K 3/62 |

(Continued)

OTHER PUBLICATIONS

Satya Narayan Shukla et al., "Black-box Adversarial Attacks with Bayesian Optimization." arXiv:1909.13857v1 [cs.LG] Sep. 30, 2019, 12 Pages.

(Continued)

*Primary Examiner* — Dhairya A Patel
(74) *Attorney, Agent, or Firm* — Dickinson Wright PLLC (57) ABSTRACT

A system includes a machine learning network input interface configured to receive input data from a sensor, one or more processors collectively programmed to receive an input data from the sensor, wherein the input data is indicative of image of a scene that includes a perturbation from a black-box attack with a physical perturbation at the scene, display an adversarial pattern at the scene, determine an objective function utilizing at least the adversarial pattern and a target classification of the machine-learning network, randomly select a plurality of data points associated with the adversarial pattern and the objective function, wherein the data points are associated with a number of queries of the objective function, obtain a machine-learning model output utilizing the data points displayed in the scene, and in response to meeting a criteria associated with the adversarial pattern and model output, identify a successful attack pattern.

20 Claims, 8 Drawing Sheets

(56) References Cited

U.S. PATENT DOCUMENTS

| | | | |
|---|---|---|---|
| 2021/0064938 | A1 | 3/2021 | Ahuja et al. |
| 2023/0004754 | A1 | 1/2023 | Fan et al. |
| 2023/0259658 | A1 | 8/2023 | Munoz Delgado et al. |
| 2024/0064157 | A1 | 2/2024 | Koseki |
| 2024/0095891 | A1 | 3/2024 | Saha et al. |
| 2024/0098118 | A1* | 3/2024 | Kaznocha ............. H04L 63/205 |
| 2024/0193931 | A1 | 6/2024 | Su et al. |
| 2024/0249116 | A1 | 7/2024 | Xu et al. |
| 2024/0311578 | A1* | 9/2024 | Laudij ................... G06F 40/103 |
| 2024/0414184 | A1* | 12/2024 | Barai .................. H04L 63/1416 |
| 2025/0095373 | A1 | 3/2025 | Monteuuis et al. |
| 2025/0217493 | A1* | 7/2025 | Shi ........................ G06F 21/577 |
| 2025/0220042 | A1* | 7/2025 | Shi ............................ G06F 8/65 |

OTHER PUBLICATIONS

Francesco Croce et al., "Sparse-RS: a Versatile Framework for Query-Efficient Sparse Black-Box Adversarial Attacks." arXiv:2006.12834v3 [cs.LG] Feb. 8, 2022, 22 Pages.

Bobak Shahriari et al., "Taking the Human Out of the Loop: A Review of Bayesian Optimization." Proceedings of the IEEE | vol. 104, No. 1, Jan. 2016, pp. 148-175.

James Tu et al., "Physically Realizable Adversarial Examples for LiDAR Object Detection." CVPR 2020, pp. 113716-13725.

Andrew Ilyas et al., "Black-box Adversarial Attacks with Limited Queries and Information." Proceedings of the 35 th International Conference on Machine Learning, Stockholm, Sweden, PMLR 80, 2018, 10 Pages.

\* cited by examiner

SYSTEM AND METHOD FOR QUERY EFFICIENT BLACKBOX PHYSICALLY REALIZABLE ATTACK WITH BAYESIAN OPTIMIZATION

TECHNICAL FIELD

The present disclosure relates to neural networks and attacks on such networks, such as black box attacks.

BACKGROUND

Adversarial attacks to an AI system consist of often small changes to the input of the AI system (such that the change is not perceived by the AI system and/or operators) such that significant changes to the output of the AI system are effected. Depending on the access and information that an attacker has to the system, these adversarial attacks may be categorized as black-box adversarial attacks and or white-box adversarial attacks. In black-box adversarial attacks, the attacker has no access to the model weights or even the architecture. Instead, the attacker gains information about the system by querying the model and observing the model's output with access only to the output or loss of the model for a given input, not to the model weights or even the architecture. For each query, the attacker must update the adversarial perturbation to obtain a new input-output pair from the model.

The most naive black-box attack method may be a random search—for each query the attacker updates the adversarial perturbation in a random direction in the feasible space (defined as the space on which changes can be effected on the input without either being perceived by the AI system or operator, or by a budget that restricts the perturbations) and if the new output yields a larger loss then it may keep the updated perturbation, otherwise use the previous one. Since the search space may be so large, it may usually take many (scale of hundreds or thousands of) queries to reach a successful attack, which can be infeasible, time-consuming, or expensive for the attacker in real-world attack scenarios. Prior art system have proposed an update mechanism by incorporating the previous queries that increase the loss (namely successful query updates), instead of random search which only uses the current query but not the previous queries into account. However, previous methods may be limited to lp-bounded perturbations, where all pixels in the image can be perturbed with a p-norm bounded strength. This attack may not be physically realizable because it modifies the image already-captured by the camera before feeding into the machine learning model.

Physically realizable attacks modify the scene, or the path between the scene and the camera, by placing an adversarial, and hence are more realistic threat models. For example, one prior art system proposes a sparse-search method for 10 attack, which can be easily modified into a patch attack, which is one of the physically-realizable attack where the patches can be printed out and placed in the scene to make the machine learning model fail. However, such a system limits the search space for each pixel value to the extreme (0 or 255 in pixel value of each channel) values. Although this largely reduced search space, it also significantly limits the number of allowed perturbations in the search space therefore reduces the attack strength, e.g., likelihood of successfully attack the machine learning (ML) model.

SUMMARY

A first embodiment discloses, a computer-implemented method for attacking a machine-learning model that includes determine an objective function utilizing at least an adversarial pattern displayed at a scene, and either (1) output of the machine-learning network, or (2) a target output of the machine-learning network, determine a maximum number of queries to the machine learning model, which includes a number of initial queries, randomly selecting a plurality of data points within the adversarial pattern's space and the objective function, wherein the plurality of data points are associated with a number of initial queries; displaying the plurality of data points in the scene to generate a rendered scene, wherein the rendered scene is received as input for the machine-learning model, obtaining a machine-learning model output utilizing the randomly selected plurality of data points displayed at the rendered scene, in response to the corresponding objective values given the previous plurality of data points and the machine-learning output, create the next adversarial pattern, display the next adversarial pattern and query the machine learning model, and generating additional adversarial patterns until identifying a successful attack pattern meeting a success criteria associated with the adversarial pattern and the machine-learning model output, or the maximum number of queries has reached.

A second embodiment discloses, a system for an attack on a machine-learning network, comprising, a machine learning network input interface configured to receive input data from a sensor, wherein the sensor includes a camera, one or more processors in communication with the input interface, wherein the one or more processors are collectively programmed to, receive an input data from the sensor, wherein the input data is indicative of image of a scene that includes a perturbation from a black-box attack with a physical perturbation at the scene, a display configured to display an adversarial pattern at the scene, determine an objective function utilizing at least the adversarial pattern and a target classification of the machine-learning network, and randomly select a plurality of data points associated with the adversarial pattern and the objective function, wherein the plurality of data points are associated with a number of queries of the objective function, obtain a machine-learning model output utilizing the randomly selected plurality of data points displayed in the scene, and in response to meeting a success criteria associated with the adversarial pattern and the machine-learning model output, identify a successful attack pattern associated with the adversarial pattern.

A third embodiment discloses, a computer-implemented method for attacking a machine-learning model includes receiving input data from one or more sensors and a display in proximity to the sensors, determining an objective function utilizing at least the adversarial pattern, and the classification of the machine-learning network, or a target classification of the machine-learning network, determining a maximum number of queries to the machine learning model, which includes a number of initial queries, randomly selecting a plurality of data points within the adversarial pattern's space and the objective function, wherein the plurality of data points are associated with a number of initial queries, obtaining a machine-learning model output utilizing the randomly selected plurality of data points converted; displaying a plurality of randomly selected data points in a scene, wherein a rendered scene is received as input for the machine-learning model, obtaining a machine-learning model output utilizing the randomly selected plurality of data points displayed, in response to the corresponding objective values given previous plurality of data points and the machine-learning output, create a next adversarial pattern, display the next adversarial pattern and query the machine-learning model, and creating new adversarial patterns until either (1) identifying a successful attack pattern meeting a criteria associated with the adversarial pattern and the machine-learning model output, or (2) the maximum number of queries has reached.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The system described herein illustrates a physically realizable black box attack utilizing Bayesian optimization, in one illustrative embodiment. By using all the past successful query updates and allowing the color of each element of the attack to be arbitrary value (any integer between 0 and 255 for each channel (for 8 bits per channel), or any real number between 0 and 1 in normalized space), this method may estimate the next query updates instead of random search. Therefore it may be more query efficient than previous systems.

Deep learning image models have shown state-of-the-art performance on many tasks such as classification, dense prediction, and regression tasks. However, these models are known to be brittle, where a small perturbation in the input space can cause false predictions. Such perturbations are called adversarial attack.

By the knowledge available to the attackers, adversarial attack can be divided into two categories—(1) white box attack where the attacker has full knowledge of the model, and (2) black box attack where the attacker can only query model output with corresponding input. Similarly, by the level of access to the input of the model, adversarial attack also falls in two categories: (1) digital attack where the attacker has access to the direct input to the model hence every pixel of the input image can be altered; and (2) the physically-realizable attack where the attacker cannot access the input directly but can add objects to the scene.

The embodiments disclose below considers an example of one of the most realistic attacks—physically realizable blackbox attack, where the attacker puts an object (for example, a monitor or screen) in the scene with adversarial patterns displayed on it. The attacker may update the adversarial pattern by querying model output, without model gradients. The system and method described below may be used to test safety critical ML systems, such as autonomous driving systems, before deployment. Since no training data may be required for generating the attack, this system and method can provide a fast worst-case performance and shorten development cycles.

Figure 1:
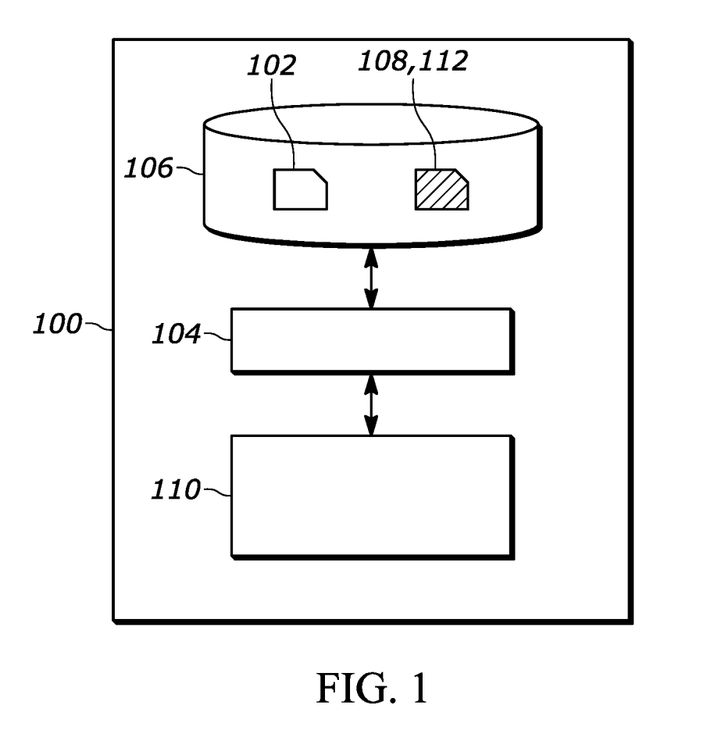
FIG. 1 shows a system for training a neural network, according to an embodiment.

Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein. Additional structure for operating and training the machine-learning models is shown in FIG. 2.

Figure 2:
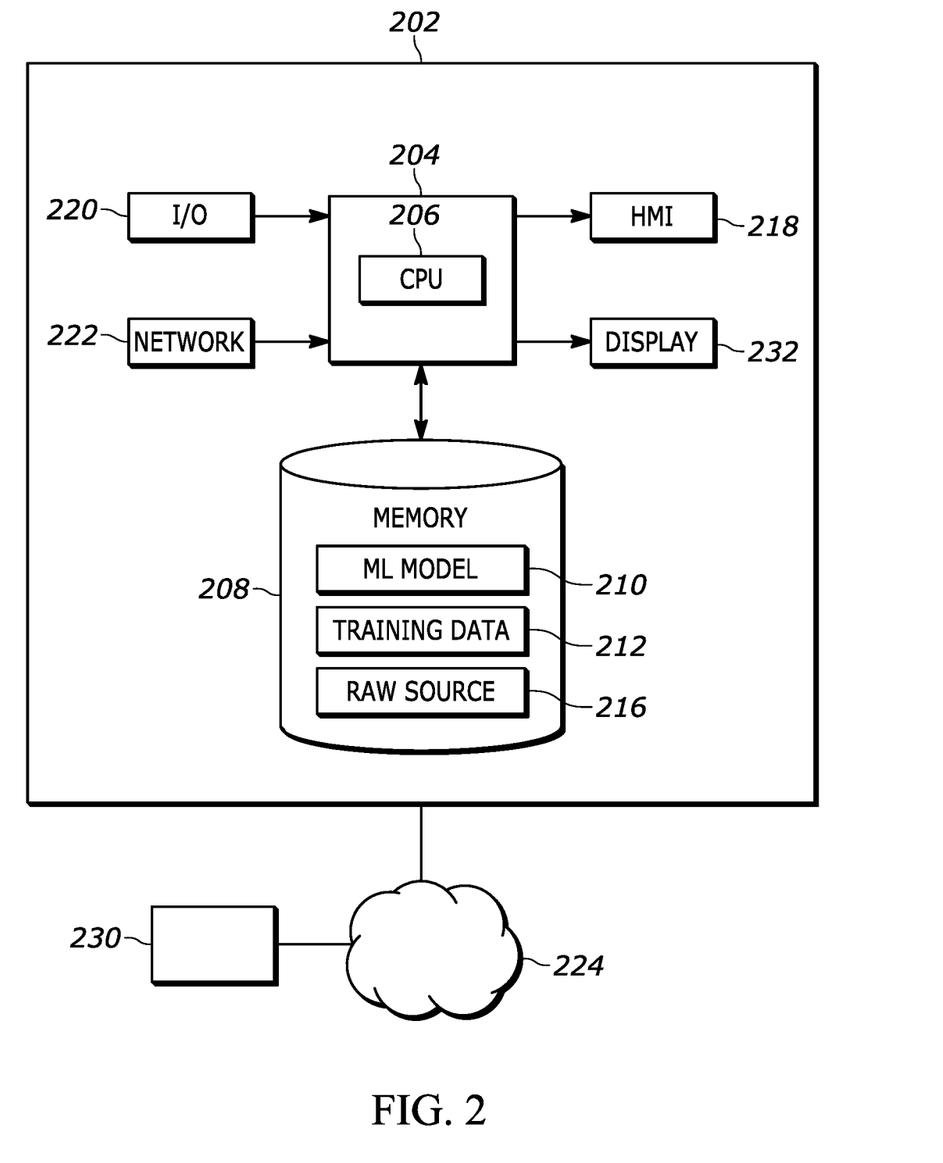
FIG. 2 shows a computer-implemented method for training and utilizing a neural network, according to an embodiment.

FIG. 2 depicts a system 200 to implement the machine-learning models described herein, for example the image-to-image machine-learning model, the mixer machine-learning model, and the pre-trained reference model described herein. The system 200 can be implemented to perform image quantization processes described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate the image-to-image machine-learning model, the mixer machine-learning model, and the pre-trained reference model described herein.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., image-to-image machine learning model, mixer machine-learning model, and pre-trained reference model) described herein, the output can be a quantized version of the input image.

Figure 3:
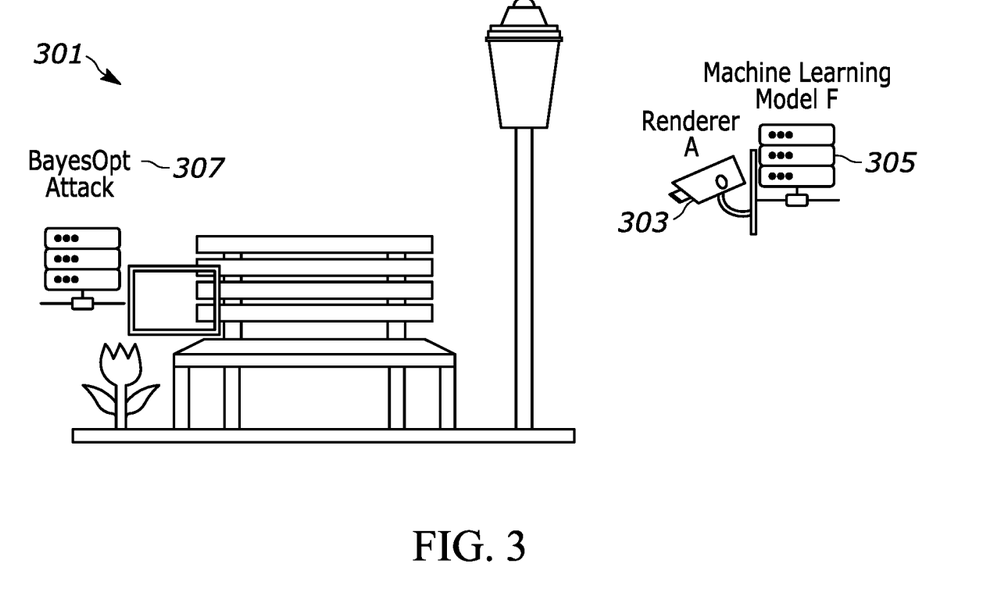
FIG. 3 illustrates an example of a scene including a perturbation.

FIG. 3 illustrates an example illustration of a scene. The scene 301 may include real world objects within it, such as a bench or flowers. Any object may be utilized in the scene. In the scene, a BayesOpt Adversaraial attack (e.g., an adversarial example that may be distinguishable from the input) may be placed to attack the image recognition system that may be utilizing the camera 303 (or any other sensor) and machine learning model 305. The system may consider a scenario that the blackbox attack that is being displayed by a screen or monitor placed in a fixed area of the scene S. Such a scene can then be represented as S+M(δ) where M is the screen with the blackbox attack δ displayed on. In one example, let f: $\mathbb{R}^{h \times w \times c} \to \mathcal{Y}$ be the machine learning model, A be the rendering function, and l(.,.) be the attacker-defined loss function that measures the difference between the model output and a specified target or label. In various embodiments, this may be applied to different ML tasks, such as regression, dense prediction, sparse prediction, etc. Then, the input image to the machine learning model may be represented as A(S+M(δ)), and the corresponding output of the ML model is f(A(S+M(δ))). An example rendered scene A(S+M(δ)), may be with attack δ 307 is shown in FIG. 3.

The blackbox attack algorithm may have access only to an output of the machine learning model, f(A(S+M(δ))), and possibly desired output with regards to benign input A(S+M(b)), where b is a benign pattern such as natural image or fully black pattern. Let this label be $y_{gt}$. Bayesian optimization is known to have poor performance with high dimensional inputs, therefore the system may set the dimension of δ to be 5×5, i.e., $\delta \in [0,1]^{5 \times 5 \times 3}$. Smaller dimensions that are smaller than 5×5, such as 4×4 or 4×5, etc., can be used as well. The monitor display function M(.) may then convert δ into an RGB image with the same resolution as the monitor and display it.

The objective of δ can be either targeted or untargeted. For targeted attack, the attacker may to bring f(A(S+M(δ))) as close to a target output $y_{target}$ as possible—in classification this can be a particular class, in regression this can be a value or vector, and in dense prediction this can be a segmentation map. The targeted attack objective function is:

$$\max_\delta h(\delta, S, M, A, y) = \min_\delta l(f(A(S+M(\delta))), y_{target}) =$$
$$\max_\delta l(f(A(S+M(b))), y_{target}) - l(f(A(S+M(\delta))), y_{target}), \delta \in [0,1]^{5\times 5 \times 3},$$

(Equation 1)

where $l(f(A(S+M(b))), y_{target})$ is the loss between the model output of a benign image b displayed on M in scene S and target $y_{target}$.

When conducting an untargeted attack, the attackers may aim to bring the model output as far away from a benign input as possible. The attackers may then first display a benign image b on the screen and query f for the benign label $y_{gt}=f(A(S+M(b)))$. The untargeted attack objective function is:

$$\max_\delta h(\delta, S, M, A, y) = \max_\delta l(f(A(S+M(\delta))), y_{gt}), \delta \in [0,1]^{5\times 5 \times 3}.$$

(Equation 2)

Note that δ may be an adversarial pattern if h(δ, S, M, A, y)>0 for (Equation 1) or (Equation 2).

The system may then use a Gaussian process model for blackbox attacks. One example of the Gaussian process model may include in Equation 1 to initialize and update δ with Bayesian optimization using the objective function h(δ, S, M, A, y) formulated in either Equation 1 or Equation 2. For a given scene(S), monitor display (M), renderer (A), and the target output $y_{target}$ or benign output $y_{gt}$, the system may simplify h(δ, S, M, A, y) into h(δ). The Gaussian process approximates the joint distribution of any finite set of samples of h(δ) as a multi-variant Gaussian variable:

$$P(h(\delta_1), \ldots, h(\delta_k)) \sim N(\mu, \Sigma), \text{ where } \mu = [\mu_1, \ldots, \mu_k].$$

(Equation 3)

The system may use constant mean $\mu_0$ and Matern Kernel (e.g., Equation 3) as the covariance function for the prior distribution. By Bayes rule, given (Equation 3), it may be easy to compute the conditional distribution of the objective function h(.) at any point $\delta_k$, as it is also a normal distribution:

$$P(h(\delta_k) \mid h(\delta_1), \ldots, h(\delta_{k-1})) =$$
$$P(h(\delta_1), \ldots, h(\delta_k))/P(h(\delta_1), \ldots, h(\delta_{k-1})).$$

(Equation 4)

Using (Equation 4), given prior attack $\delta_1, \ldots, \delta_{k-1}$, the method/system may then select the next attack $\delta_k$ that maximizes the expective improvement of h(.):

$$\delta_k = \text{argmax}_\delta E_k[\max(h(\delta) - h^*_{k-1}, 0)],$$

(Equation 5)

where $h^*_{k-1} = \max(h(\delta_1), \ldots, h(\delta_{k-1}))$.

The attacker may then display $\delta_k$ on the screen, query the output of the network $f(A(S+M(\delta_k)))$, compute $h(\delta_k)$ until either the output or the objective function satisfies the success condition g(δ): $[0,1]^{5\times 5 \times 3} \to \{0,1\}$, where 1 indicates a success. For classification models, the success condition could be $f(A(S+M(\delta_k))) \neq y_{gt}$ for untargeted attack or $f(A(S+M(\delta_k))) = y_{target}$ for targeted attack. For other tasks, the success condition could be $h(\delta_k) \geq TH$, where TH is a pre-set loss value.

Figure 4:
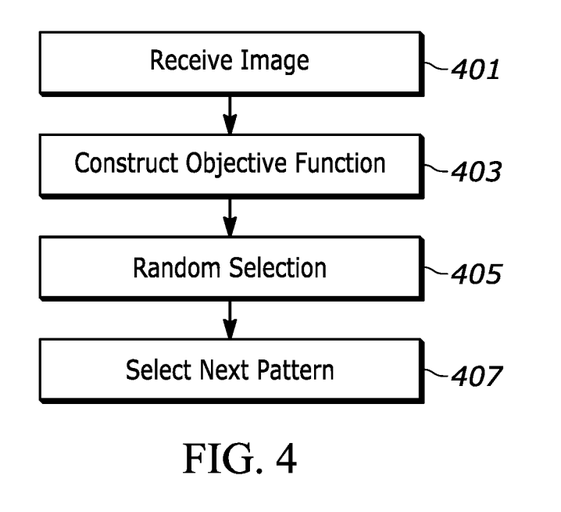
FIG. 4 illustrates a flow chart associated with an embodiment of displaying a scene with a perturbation.

FIG. 4 illustrates an example flow chart according to an embodiment utilizing. At step 401, the system may receive one or more images. The images may be associated with a scene S. The system may a monitor display that is setup for physically realizing a black box attack. Thus, the algorithm may not directly know the input image which is the rendered scene with an adversarial pattern display, so neither the rendering function (A) nor the display function may be a factor to the algorithm. The system may be in communication with a machine learning system f(.) and a loss function l(.,.).

At step 403, the system may construct objective function h(δ) using (Equation 1) with $y_{target}$ or (Equation 2) with $y_{gt}$. The system may also compute a conditional distribution of the objective function at any point $\delta_K$, as it is a normal distribution. The objective function may be described in the paragraphs above.

At step 405, the system may randomly select K points $\{\delta_1, \ldots, \delta_K\}$ in $[0,1]^{5\times 5 \times 3}$, and then display each $\delta_i$, i=1, ..., K on the screen in the scene, obtain ML model output $f(A(S+M(\delta_i)))$ to evaluate h(.) at the selected points. The system may use $h(\delta_1), \ldots, h(\delta_K)$ to estimate mean and covariance of the prior distribution as shown in Equation 3. Thus, the Gaussian process may be utilized to approximate the joint distribution of a finite set of samples of the adversarial patterns as a multi-variant Gaussian variable.

At step 407, the system may elect the next attack pattern $\delta_i$ using (Equation 5). The system may then compute objective function $h(\delta_i)$ and success criteria $g(\delta_i)$. At decision 409, the system may determine if a success criteria g(δ) has been met. The desired output $y_{target}$ may be utilized for a targeted attack. The benign output $y_{gt}$ may be utilized for an untargeted attack. If the system calculate $g(\delta_i)=1$, it may return $\delta_i$ as a successful attack pattern. If the system calculates $g(\delta_i)=0$ and i<$K_{max}$, it may repeat this step. If $g(\delta_i)=0$ and i=$K_{max}$, end the attack procedure as unsuccessful. The number of initial queries K may defined, as well as the maximal number of queries $K_{max}$. At step 411, the system may output the success pattern.

Figure 5:
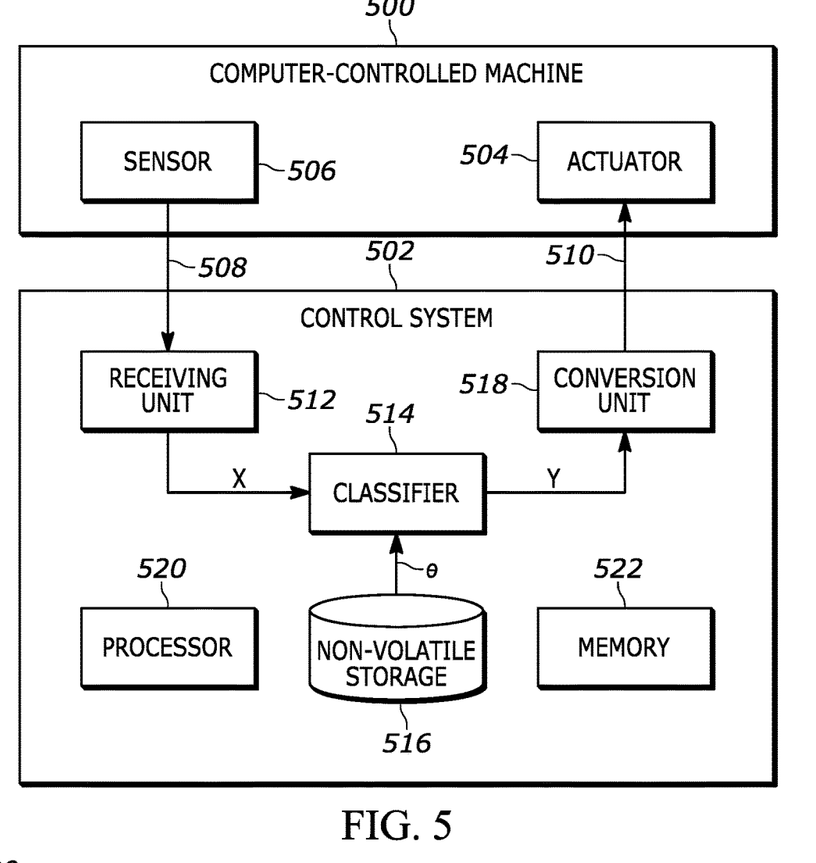
FIG. 5 depicts a schematic diagram of an interaction between a computer-controlled machine and a control system, according to an embodiment.

The machine-learning models described herein can be used in many different applications, and not just in the context of road sign image processing. Additional applications where image quantization may be used are shown in FIGS. 6-11. Structure used for training and using the machine-learning models for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter $\theta$). Parameters $\theta$ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
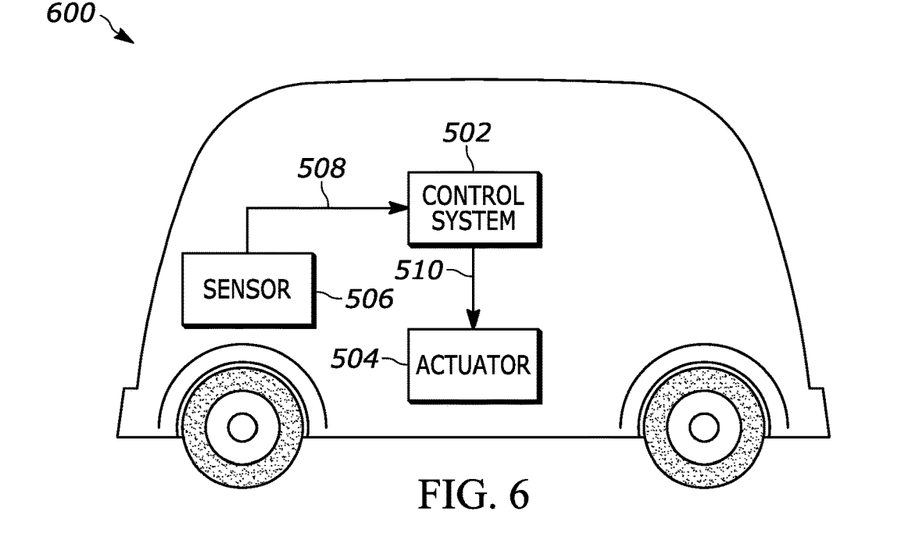
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
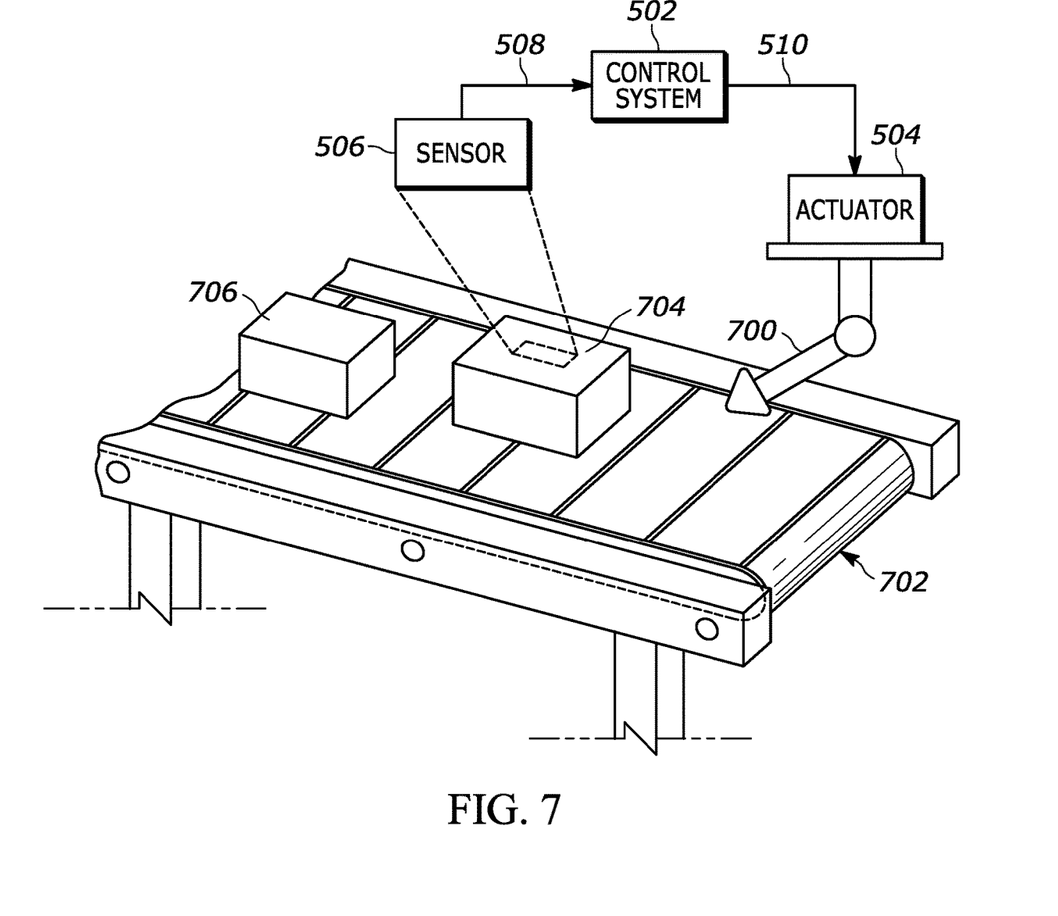
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
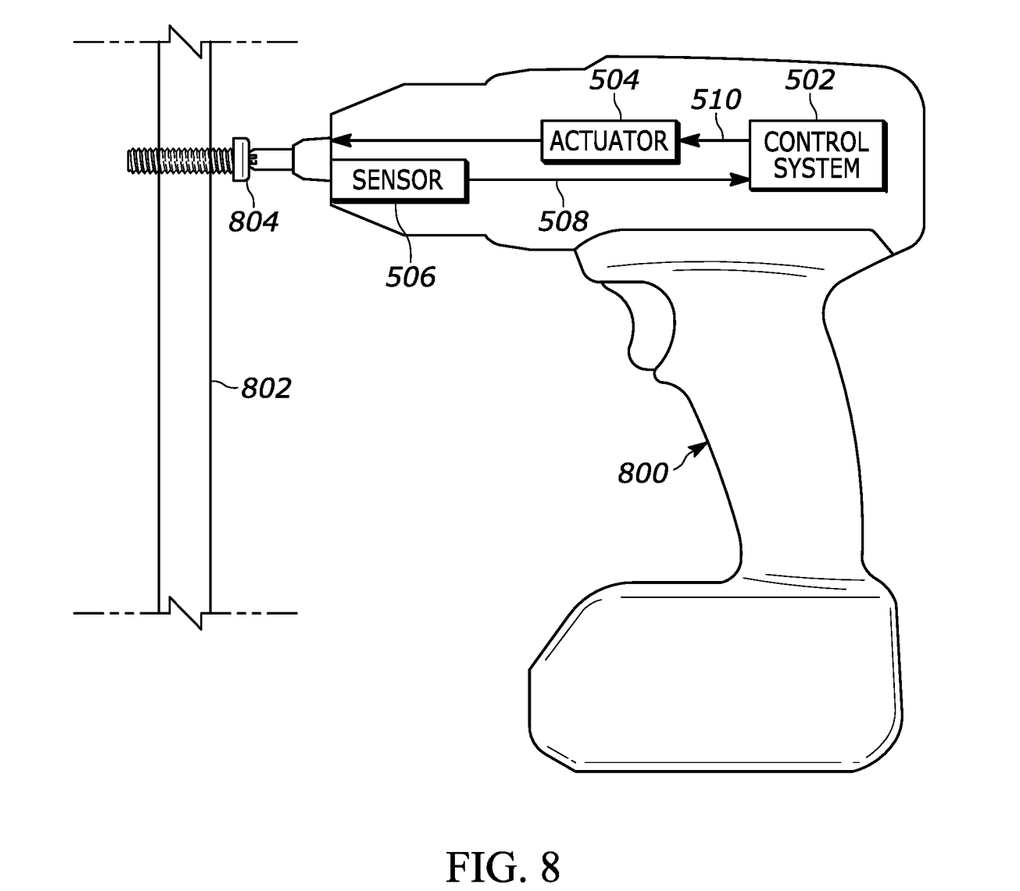
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
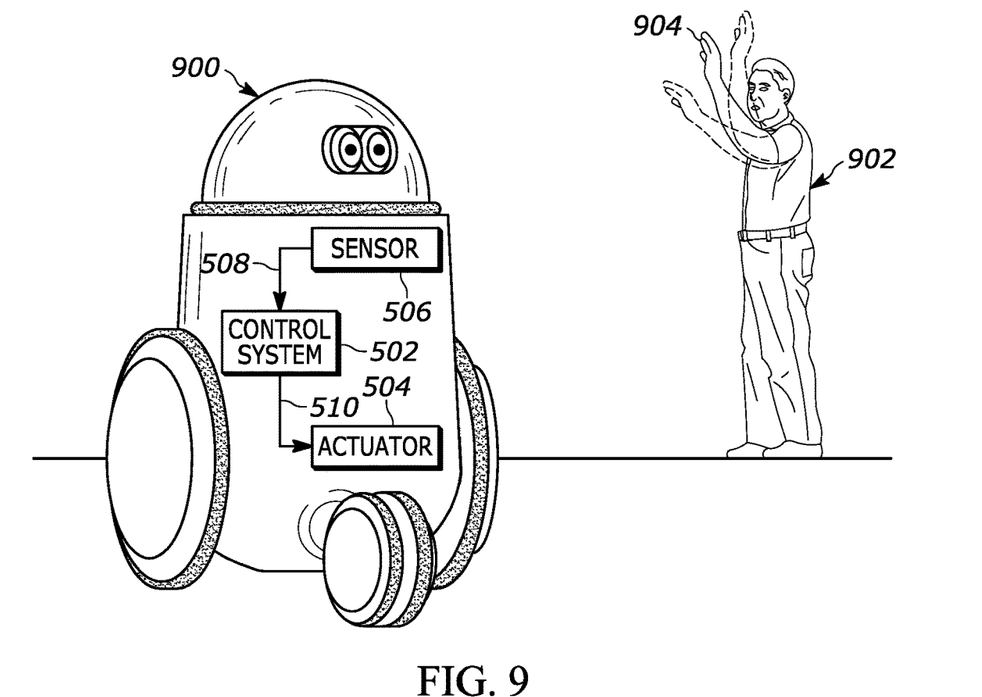
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
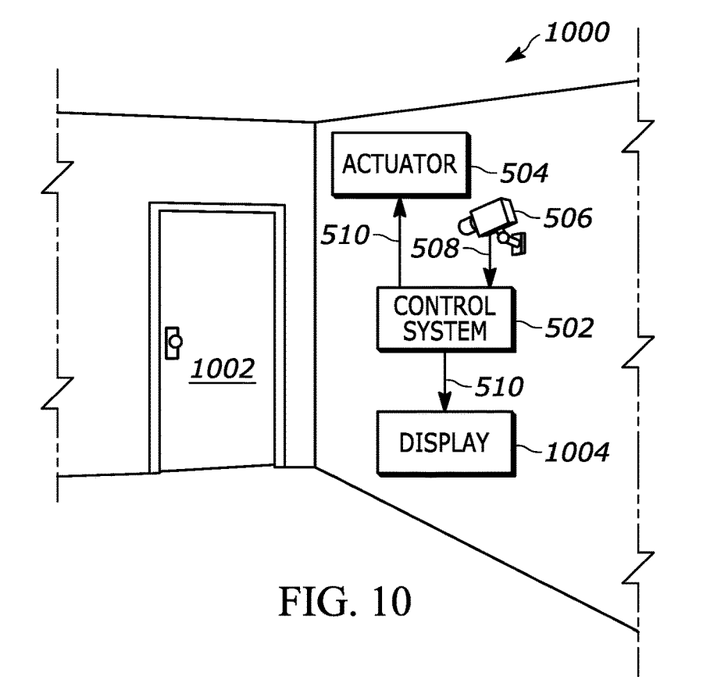
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
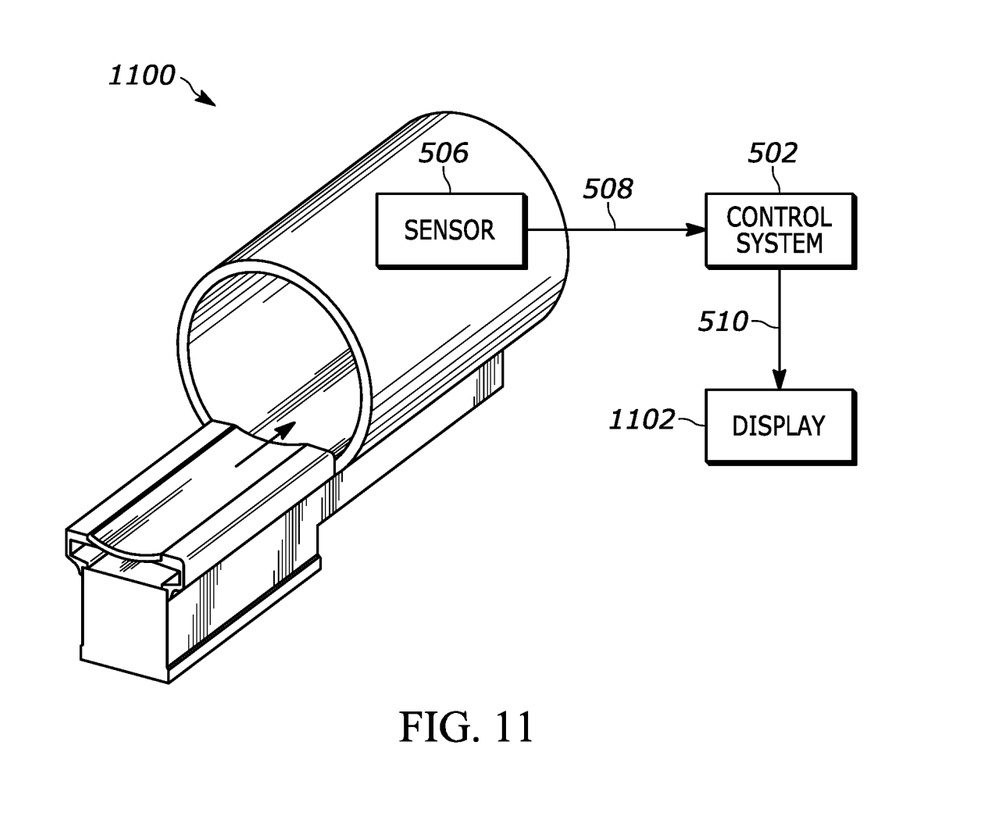
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for attacking a machine-learning model, comprising:
   determine an objective function utilizing at least an adversarial pattern displayed at a scene, and either (1) output of the machine-learning network, or (2) a target output of the machine-learning network;
   determining a maximum number of queries to the machine learning model, which includes a number of initial queries,
   randomly selecting a plurality of data points within the adversarial pattern's space and the objective function, wherein the plurality of data points are associated with a number of initial queries;
   displaying the plurality of data points in the scene to generate a rendered scene utilizing a system, wherein the rendered scene is received as input for the machine-learning model;
   obtaining a machine-learning model output utilizing the randomly selected plurality of data points displayed at the rendered scene;
   in response to the corresponding objective values given the previous plurality of data points and the machine-learning output, creating the next adversarial pattern at the system,
   displaying the next adversarial pattern and querying the machine learning model; and
   generating, via the system, additional adversarial patterns until identifying a successful attack pattern meeting a success criteria associated with the adversarial pattern and the machine-learning model output, or the maximum number of queries has reached.

2. The computer-implemented method of claim 1, wherein the dimensional input is 5×5.

3. The computer-implemented method of claim 1, wherein the adversarial pattern is an RGB image.

4. The computer-implemented method of claim 1, update the adversarial pattern with Bayesian optimization utilizing the objective function.

5. The computer-implemented method of claim 1, wherein no training data is utilized to identify the successful pattern.

6. The computer-implemented method of claim 1, wherein the adversarial pattern is located on a display or monitor in a scene within sensor range.

7. The computer-implemented method of claim 1, wherein the method includes initializing and updating the adversarial pattern with Bayesian optimization utilizing the objective function.

8. The computer-implemented method of claim 1, wherein the input data includes video information obtained from the camera.

9. A system including an attack for a machine-learning network, comprising:
 a machine learning network input interface configured to receive input data from a sensor, wherein the sensor includes a camera;
 one or more processors in communication with the input interface, wherein the one or more processors are collectively programmed to:
 receive an input data from the sensor, wherein the input data is indicative of image of a scene that includes a perturbation from a black-box attack with a physical perturbation at the scene;
 display an adversarial pattern at the scene;
 determine an objective function utilizing at least the adversarial pattern and a target classification of the machine-learning network; and
 randomly select a plurality of data points associated with the adversarial pattern and the objective function, wherein the plurality of data points are associated with a number of queries of the objective function;
 obtain a machine-learning model output utilizing the randomly selected plurality of data points displayed in the scene; and
 in response to meeting a success criteria associated with the adversarial pattern and the machine-learning model output, identify a successful attack pattern associated with the adversarial pattern.

10. The system of claim 9, wherein the processor is programmed to randomly convert the adversarial pattern utilizing a monitor display function.

11. The system of claim 9, wherein the dimensional input is 5×5 dimensions or less.

12. The system of claim 9, wherein the one or more processors is a single processor.

13. The system of claim 9, wherein the one or more processors are collectively programmed to initialize and update the adversarial pattern with Bayesian optimization utilizing the objective function.

14. The system of 9, wherein the input data includes radar, sonar, or sound information.

15. A computer-implemented method for attacking a machine-learning model, comprising:
 receiving input data from one or more sensors and a display in proximity to the sensors,
 determining an objective function utilizing at least the adversarial pattern, and the classification of the machine-learning network, or a target classification of the machine-learning network;
 determining a maximum number of queries to the machine learning model, which includes a number of initial queries,
 randomly selecting a plurality of data points within the adversarial pattern's space and the objective function, wherein the plurality of data points are associated with a number of initial queries;
 obtaining a machine-learning model output utilizing the randomly selected plurality of data points converted; and
 displaying a plurality of randomly selected data points in a scene, wherein a a rendered scene is received as input for the machine-learning model;
 obtaining a machine-learning model output utilizing the randomly selected plurality of data points displayed;
 in response to the corresponding objective values given previous plurality of data points and the machine-learning output, creating a next adversarial pattern;
 displaying the next adversarial pattern and query the machine-learning model;
 creating new adversarial patterns until either (1) identifying a successful attack pattern meeting a criteria associated with the adversarial pattern and the machine-learning model output, or (2) the maximum number of queries has reached.

16. The computer implemented method of claim 15, wherein the instructions include selecting the plurality of data points is conducted randomly.

17. The computer implemented method of claim 15, wherein the objective function includes a loss between output associated with a target classification and a benign scene.

18. The computer implemented method of claim 15, wherein the instructions include initializing and updating the adversarial pattern with Bayesian optimization utilizing the objective function.

19. The computer implemented method of claim 18, wherein the Bayesian optimization utilizes a Gaussian process to approximate a joint distribution of samples associated with the adversarial pattern.

20. The computer implemented method of claim 18, wherein the success criteria includes a threshold associated with the adversarial pattern.

* * * * *